United States Patent
Sutter

(10) Patent No.: US 6,513,032 B1
(45) Date of Patent: Jan. 28, 2003

(54) SEARCH AND NAVIGATION SYSTEM AND METHOD USING CATEGORY INTERSECTION PRE-COMPUTATION

(75) Inventor: Paul Sutter, San Francisco, CA (US)

(73) Assignee: Alta Vista Company, Palo Alto, CA (US)

( * ) Notice: Subject to any disclaimer, the term of this patent is extended or adjusted under 35 U.S.C. 154(b) by 0 days.

(21) Appl. No.: 09/429,770

(22) Filed: Oct. 28, 1999

Related U.S. Application Data

(60) Provisional application No. 60/106,500, filed on Oct. 29, 1998.

(51) Int. Cl.[7] .............................................. G06F 17/30
(52) U.S. Cl. ............................................... 707/3; 707/5
(58) Field of Search ............................... 707/3, 1, 2, 4, 707/5, 6, 7, 10, 102, 104, 203

(56) References Cited

U.S. PATENT DOCUMENTS

| | | | | |
|---|---|---|---|---|
| 5,613,110 A | * | 3/1997 | Stuart ........................... | 705/29 |
| 5,727,196 A | * | 3/1998 | Strauss et al. ................. | 707/2 |
| 5,819,286 A | * | 10/1998 | Yang et al. .................... | 707/1 |
| 6,199,058 B1 | * | 3/2001 | Wong et al. ................... | 707/2 |

OTHER PUBLICATIONS

Edelstein, Herb, "Faster Data Warehouses", Dec. 4, 1995, http://techweb.cmp.com/iwk, pp. 77–88.

Winchell, Jeff, "dBase IV 2.0 Query Innovations", Sep. 1993, vol. 5, No. 10, p. 68.

Banatre, Jean–Pierre and Le Metayer, Daniel, "Programming By Multiset Transformation", Jan. 1993, vol. 36, No. 1, p. 98.

Liu, Guang–Sheen and Chen, Huei–Huang, "Parallel Merge Module For Combining Sorted Lists", May 1989, *IEE Proceedings*, vol. 136, Pt. E, No. 3, pp. 161–165.

Huang, Bing–Chao and Langston, Michael A., "Practical In–Place Merging", Mar. 1988, vol. 31, No. 3, *Communications of the ACM*, pp. 348–352.

\* cited by examiner

Primary Examiner—Sanjiv Shah
(74) Attorney, Agent, or Firm—Fenwick & West LLP

(57) ABSTRACT

A user can access database documents across category hierarchies by executing a computer program that operates on a pre-computed intersection list. The intersection list comprises a plurality of report keys which are generated off-line by combining index terms in database documents with category descriptors to form text strings having a name/value type format. All report keys from all documents are combined and sorted to determine a set of unique report keys. Each unique report key is updated with a count of the number of documents sharing the same report key. Additionally, each updated report key includes a pointer to a bit-map corresponding to the lowest level category in a category hierarchy. The updated report keys are resorted to provide an intersection list for retrieving document information from databases and other information sources in response to the user's online search queries.

9 Claims, 16 Drawing Sheets

Report Key Set

- company.acme.function.adbudget
- company.acme.function.consumption
- ■
- company.acme.industries.food
- company.acme.industries.candy
- ■
- company.acme.products.chocolatecandy
- company.acme.products.dogandcatfood
- ■
- ■

*FIG. 10*

Intersection List company.acme.function.-68.adbudget
company.acme.function.-9.consumption

■ company.acme.industries.-337.food
company.acme.industries.-237.candy

■ company.acme.products.-172.chocolatecandy
company.acme.products.-18.dogandcatfood

SEARCH AND NAVIGATION SYSTEM AND METHOD USING CATEGORY INTERSECTION PRE-COMPUTATION

This application claims priority under 35 U.S.C. § 119(e) to U.S. application Ser. No. 60/106,500, filed Oct. 29, 1998.

FIELD OF THE INVENTION

The invention relates to searching and navigating databases and other information sources and, more particularly, to a system and method using category intersection pre-computation to facilitate search and navigation.

BACKGROUND OF THE INVENTION

An ever increasing amount of information is becoming available electronically, particularly through wide-area networks such as the Internet. The Internet and its various document collections as found in USENET, the World Wide Web, and various FTP and similar sites, is perhaps the largest collection of full-text information available. Already, tens of millions of documents are available in various document databases on the Internet. Performing rapid searches for information on the Internet already requires expensive, high performance computers with vast quantities of RAM and fast disk drives. Even worse, the Internet is rapidly growing. Some estimates claim that the amount of information available on the Internet doubles every four months. Effective computer performance doubles only every 18 to 24 months, and the cost per megabyte of storage improves even more slowly.

Based on these estimates, it's no wonder that online searching of large databases via the Internet can be costly and time consuming. Indeed, Internet users sometimes have to wait several minutes for there searches to complete, thus consuming large amounts of costly connect time. In addition, users often need to repeatedly narrow, expand, or refocus their searches, which can result in unnecessary or redundant searches through a database.

Various factors can influence the results provided by database search engines. Some of these factors include the size of the database searched, frequency of updates of the database, search capability and design, and speed. For example, many conventional search engines use databases that organize information into broad subject category hierarchies which makes it difficult for users to quickly narrow, expand, or refocus their search across category hierarchies. For example, conventional search engines typically do not allow users to refocus their search from one category hierarchy to another without losing previous search and navigation results. Rather, these search engines often force users to restart the search and navigation process at the top level of the new category hierarchy to be searched, thereby losing any previous search results. Thus, these conventional systems and methods can add considerable delay to the search process.

Accordingly, there is a need for a system and method for quickly searching databases and other information sources. Such a system and method should allow users to search and navigate across category hierarchies without losing results obtained from previous searches.

SUMMARY OF THE INVENTION

The present invention is directed to a computer-implemented search and navigation system and method using category intersection pre-computation. Generally, intersection pre-computation is the pre-determination, prior to query processing, of a large number of intersections or combinations of different terms and categories, and the documents that are relevant to such intersections. These intersections (hereinafter also referred to as "report keys") are generated for each document in a database having a plurality of documents. The report keys contain information that allows a user to navigate between category hierarchies while maintaining previous search results.

More particularly, each document in the database is scanned for a plurality of index terms. The index terms are combined with predefined top level category descriptors to form report keys. Each report key further includes a pointer to the memory address of a bit-map corresponding to the lowest subcategory descriptor in a category hierarchy. The report keys generated from the documents are combined into an intersection list. The intersection list is sorted according to a pre-determined sort criteria. A count of the number of same report keys is determined from the sorted intersection list and used to update same report keys using, for example, negative hexadecimal numbers. Redundant report keys are deleted from the intersection list to produce a smaller intersection list. The smaller intersection list is resorted to arrange the report keys according to a predetermined order based on the updated count in each report key.

In one embodiment of the present invention, the user selects a target company and a top level category to define the scope of the search. In response to the user's selections, a pre-computed intersection list is traversed to identify all report keys falling within the defined scope of the search. The identified report keys are formatted and displayed to the user. Preferably, the display includes one or more subcategory descriptors, and a count of the number of documents that fall within each subcategory. The document counts or "hits" enable the user to determine which subcategories will provide the most fruitful search.

The user selects one of the subcategories from the formatted display to further narrow the scope of the search. In response to the user's selection, the intersection list is used to determine the memory address of the bit-map linked to the selected subcategory. The bit-map is retrieved and logically "AND" with term bit-maps corresponding to the target company and top level category, respectively, to produce a first result bit-map. The first result bit-map is used to retrieve document information from the database.

Alternatively, the user can refocus the search by selecting a different top level category by clicking on a tool bar presented to the user as part of the formatted display. In response to the user's selection, the intersection list is again traversed and the report keys falling within the defined scope of the target company and the new top level category are identified. The bit-maps linked to these report keys are each logically "AND" with the first result bit-map to produce a second result bit-map. The second result bit-map is used to retrieve document information from the database.

The present invention provides an advantage over conventional systems by using a pre-computed intersection list. The intersection list enables users to combine category searches with text searches during runtime. Further, the intersection lists enables user to easily access related information between category hierarchies without adding considerable delay to the search by performing redundant searches via top level categories.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 10 is an illustration of a report key set in accordance with one embodiment of the present invention;

FIG. 12 is an illustration of an intersection list in accordance with one embodiment of the present invention;

DETAILED DESCRIPTION OF THE INVENTION

The preferred embodiment of the present invention, as described hereinafter, largely pertains to search and navigation of business information databases on the Internet. It is noted, however, that other embodiments are within the spirit and scope of the present invention such as, for example, providing search and navigation systems and methods for use with standalone computers or computer networks including distributed networks. Moreover, the present invention is not limited to searching business information databases, but may also be used with any information capable of being categorized and/or indexed.

It is further noted that the present invention is applicable to any kind of database including: relational, object oriented, hierarchial, and network databases.

To facilitate the reader's understanding of the present invention, the operation of the present invention from a user's perspective will be described first, followed by a detailed description of the underlying systems and methods.

Figure 1:
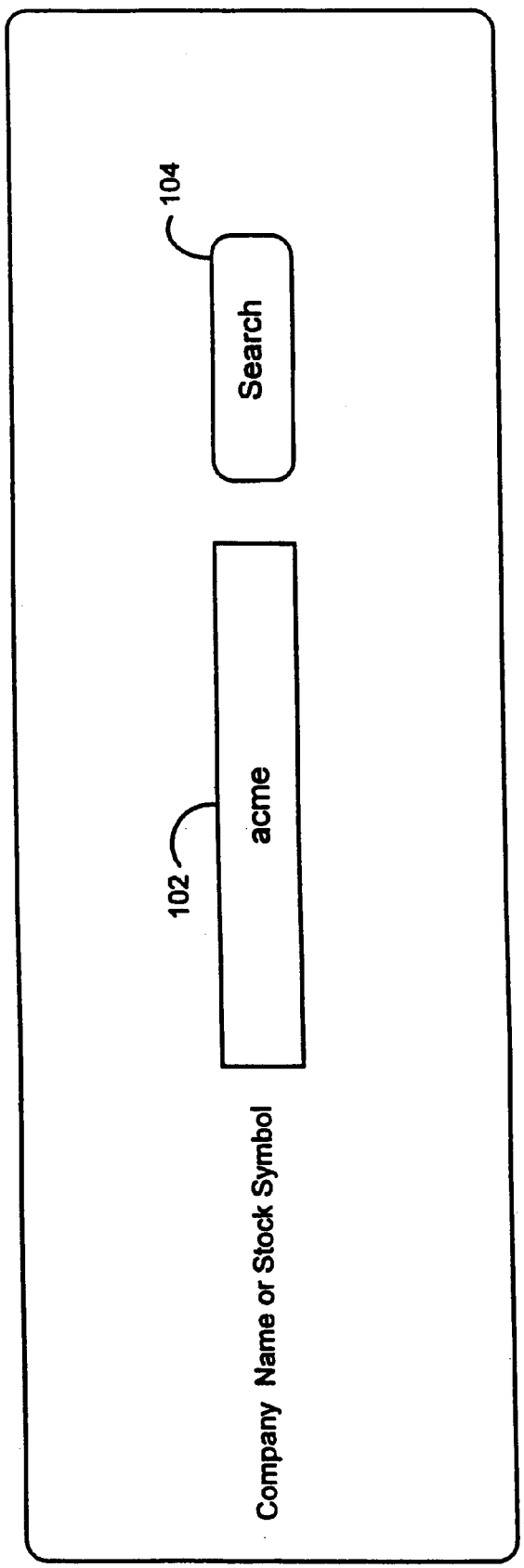
FIG. 1 is an illustration of search form 100 in accordance with one embodiment of the present invention.

Referring to FIG. 1, there is shown an illustration of search form 100 in accordance with one embodiment of the present invention. Search form 100 is a GUI for providing users with a mechanism for initiating search queries on a business information database. The GUI can be, for example, a web page written in Hypertext Markup Language (HTML) for access by users on the Internet. Preferably, GUIs are presented to users through visual display units coupled to computer systems, as described in further detail below.

Search form 100 preferably includes text entry field 102 and search button 104. The user has the option to enter a company's name or its stock symbol into the text entry field 102. Search button 104 is a small graphical image or icon which the user can click on (e.g., using a mouse) to initiate a search on the term(s) entered in text entry field 102.

In this example, to be used hereinafter, the user enters in text entry field 102 the name or stock symbol of a company of interest, for example, "acme," which is short for Acme Inc., a fictitious candy company. By using, for example, a mouse to click on search button 104, the user can initiate a search for business information relating to Acme Inc.

Figure 2:
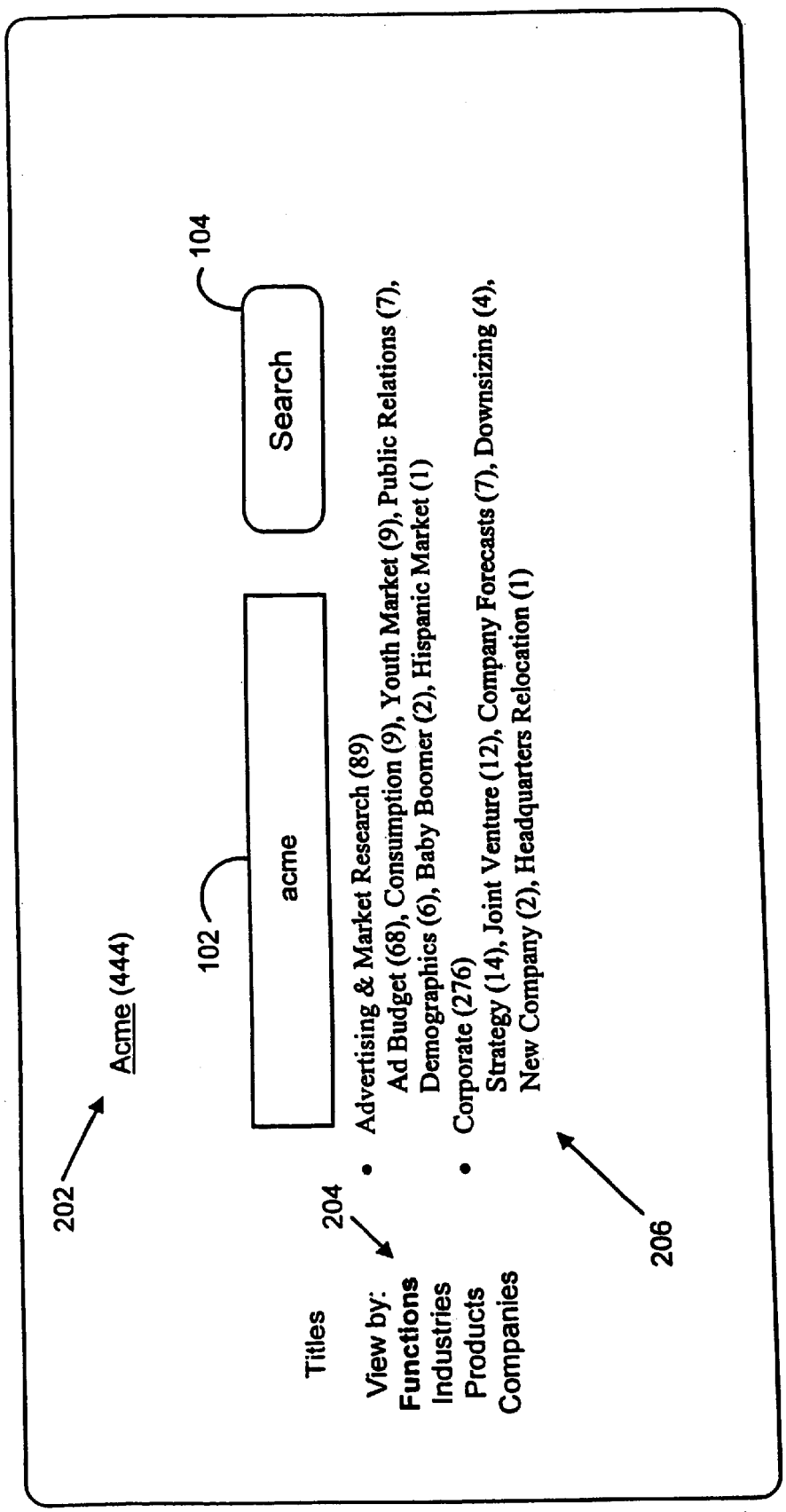
FIG. 2 is an illustration of search results in accordance with one embodiment of the present invention.

Referring to FIG. 2, there is shown an illustration of search results in accordance with one embodiment of the present invention. Search form 200 is presented to the user in response to the user typing "acme" in the text entry field 102 of search form 100, and clicking on search button 104. Alternatively, the user can be presented with an intermediate search form (not shown) including a list of subsidiaries of divisions of the target company from which the user can select to focus the search on a specific business entity within or associated with the target company Acme Inc. After selecting a subsidiary or division of the target company, search form 200 is presented to the user. For the present example, we assume Acme Inc., the parent company, is the target of the search.

In the preferred embodiment, search form 200 includes text entry field 102 and search button 104 for executing a term search in documents related to Acme, Inc. Additionally, search form 200 includes selection list 202 which lists from top to bottom in chronological order the user's previous selections. By looking at this list, the user is able to instantly know the present scope of the search. In the present example, the selection list 202 includes the term "Acme" to indicate to the user that the scope of the present search is limited to documents related to Acme Inc. That is, the search is now restricted to only those documents within the scope of selection list 202. Additionally, the number of documents in the database relating to Acme Inc. (hereinafter also referred to as "hits") is shown in parentheses adjacent the company name. In the present example, the number of hits is "444." It is noted, however, that the number of hits for any particular category is subject to fluctuation as documents are added and removed from the database. An advantage of having the number of hits displayed next to the category is that it allows the user to determine whether a particular category includes a sufficient number of documents to justify a search, thereby by saving he user from initiating fruitless searches.

To the left of text entry field 102 is a top level category list 204 for selection by the user. The top level category list 204 includes top level categories which are the highest level category in a pre-defined category hierarchy. In the example embodiment of a business information database, the top level categories include: Functions, Industries, Products, and Company. In other contexts, different categories will apply. In the present example, the top level category "Functions" is selected by the user. When selected, the top level category "Functions" is presented in bold font as show in FIG. 2. In response to selecting the "Functions" category, the user is presented with a formatted display of subcategories 206 organized under broad subject headings, such as "Advertising & Market Research." Located next to the broad subject headings in parentheses is the combine number of document hits in all subcategories within the scope of the broad subject heading. For example, there are eighty-nine documents corresponding to Acme Inc. that also fall within the broad subject heading of "Advertising & Market Research."

Listed under each broad subject heading are subcategories 206 related to the subject heading. One example of a subcategory is "Ad Budget." This subcategory includes documents relating to the advertising budgets of Acme Inc. Specifically, there are sixty-eight documents that fall within this subcategory as indicated in the parentheses next to the subcategory name "Ad Budget." Other subcategories 206 under the subject heading of "Advertising & Market Research" include: "Consumption (9)", "Youth Market (9)", "Public Relations (7)", etc., as shown in FIG. 2. Each of the subcategories 206 includes the number of documents (i.e., hits) related to the subcategory as indicated in the parentheses next to the subcategory name.

It is noted that the number and type of top level categories, subcategories, and subject headings is a design choice, and other categories, subcategories, and subject headings are possible without departing from the spirit and scope of the present invention.

Figure 3:
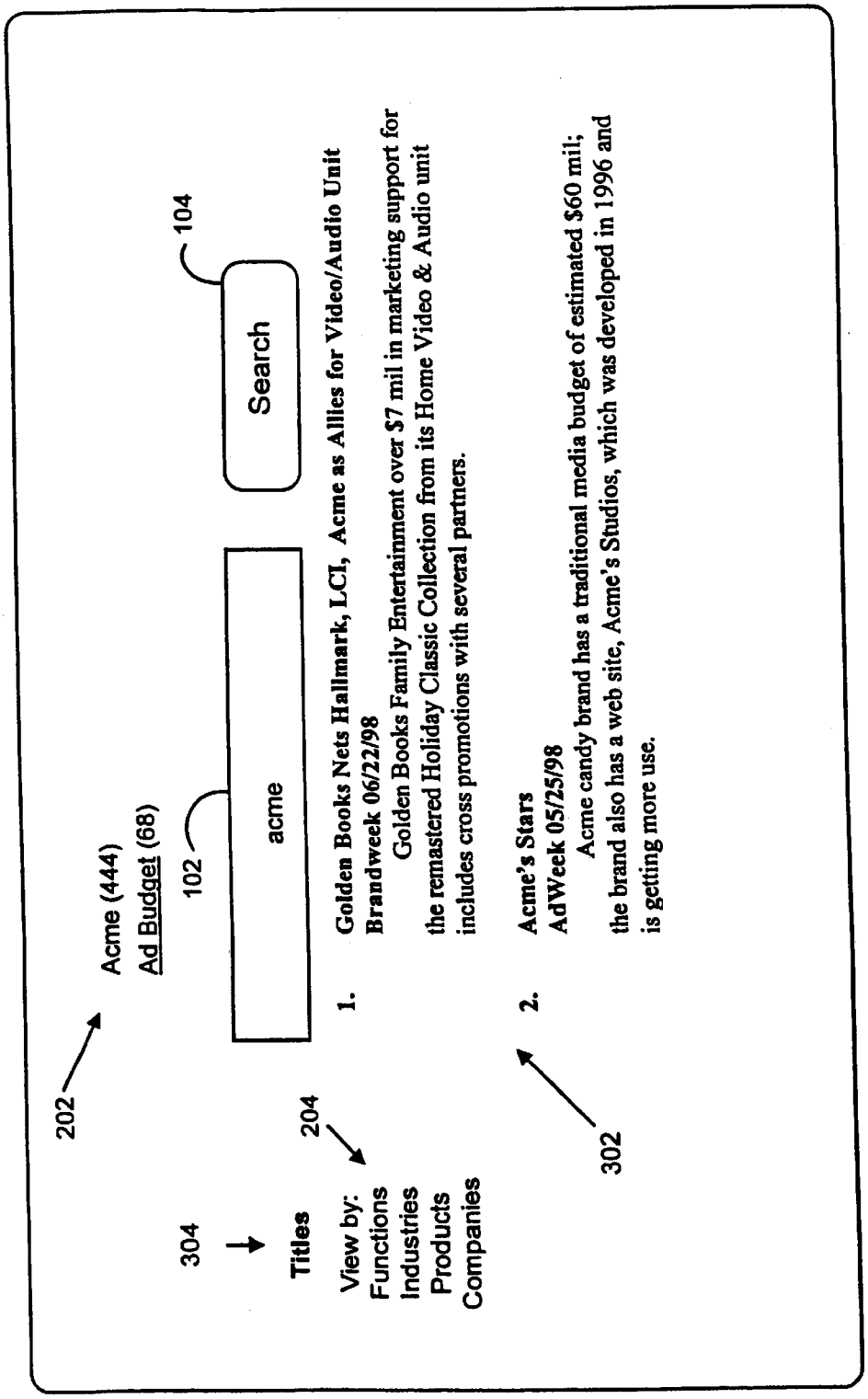
FIG. 3 is an illustration of search results in accordance with one embodiment of the present invention.

Referring to FIG. 3, there is shown an illustration of search results in accordance with one embodiment of the present invention. Search form 300 is presented to the user in response to the user clicking on the subcategory "Ad Budget" in search form 200. Search form 300 includes selection list 202 which now includes the top level category "Acme" and the function subcategory "Ad Budget." The selection list 202 indicates to the user that the scope of the search is limited to documents relating to advertising budgets for Acme Inc. To the left of text entry field 102 is top level category list 204 for selection by the user. Above the top level category list 204 is a "Titles" bar 304, which, when selected, is presented in bold font as shown in FIG. 3. Additionally, Search form 300 includes text entry field 102 and search button 104 for executing a term search in documents limited to the scope of selection list 202.

In response to the user selecting the "Ad Budget" subcategory listed on search form 200, the user is presented with document titles 302 relating to the advertising budget of Acme Inc. Generally, document titles 302 are presented in response to the user's selection of the "Titles" bar 304. In the preferred embodiment, however, the "Titles" bar 304 is selected as a default response to the user's selection of a subcategory from search form 200 in FIG. 3. When selected, the "Titles" bar 304 is presented in bold font on search form 300.

In the preferred embodiment, document titles 302 are listed in reverse chronological order according to date. It is noted, however, that document titles 302 can be displayed according to any "sort" criteria, including alphabetical order by title, author, or publisher. Under each of the document titles 302 there is, for example, an abstract summarizing the contents of the title.

Figure 4:
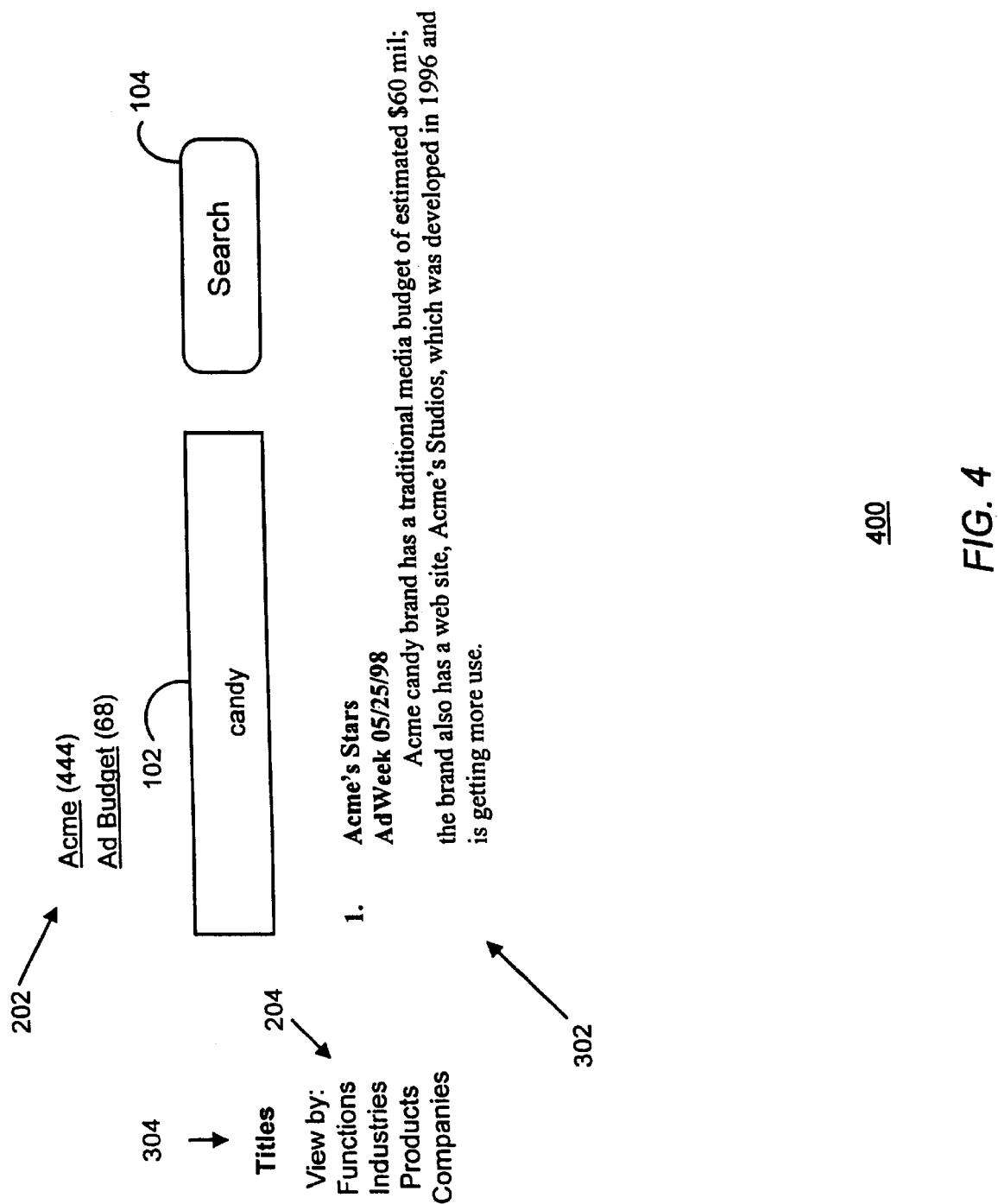
FIG. 4 is an illustration of search results in accordance with one embodiment of the present invention.

Referring to FIG. 4, there is shown an illustration of search results in accordance with one embodiment of the present invention. Search form 400 is presented to the user in response to the user typing the term "candy" in text entry field 102 and clicking on search button 104 in search form 300. This action by the user is known as a term search or text search. In the present example, the term "candy" is used to select a subset of document titles 302 from the set of retrieved document titles that have the term "candy" in the text of the document.

Generally, search terms may be entered in text entry field 102 in quotes to indicate that documents should be selected if they contain the quoted phrase. Alternatively, multiple terms can be entered in text entry field 102 delineated by commas or spaces. It is understood, however, that other known formats for user queries are possible without departing from the spirit and scope of the present invention.

Search form 400 illustrates important advantages that the present invention has over conventional search and navigation systems and methods. First, it is noted that the present invention allows a user to combine category searches and term(s) searches in realtime. For example, the user can narrow a document search by selecting a top level category from the top level category list 204 which includes, for example, Functions, Industries, Products, and Company (FIG. 2). The present invention displays a list of subcategories 206 in response to the user's selection of one of the top level categories. At this point in the search, the user can refine the search by selecting a subcategory or entering term(s) in text entry field 102 to further narrow the search. If the user selects the former, the user is presented with document titles 302 (FIG. 3) that are within the scope of the top level category and selected subcategory, or upon further selection, multiple subcategories. Alternatively, if the user enters search term(s) in text entry field 102, the user is presented with a subset of subcategories 206 (not shown) of the top level category. This subset of subcategories only includes documents having the search term(s). At any point in the search process, the user can select a new top level category from the top level categories list 204 by clicking on the desired top level category. In response, the present invention displays a new list of subcategories 206 related to the newly selected top level category, such as "Products." If the user initiated a term(s) search in a previous search form, the new list of subcategories 206 only includes documents having those term(s).

Second, the present invention enables users to quickly refocus the scope of their search to a different subcategory by simply clicking on a desired subcategory in search form 200. In response, the present invention provides a new set of document titles without conducting a new search through higher level categories. In other words, the present invention allows the user to search and navigate between category hierarchies. This capability is provide by a novel intersection list, which is described in detail below.

In sum, the present invention provides a high level of flexibility to the user for searching and navigating through documents in a database. The user can easily narrow, expand, and refocus the scope of the search across categories and subcategories of documents in combination with term or text searching. More importantly, the user can narrow, expand, or refocus the scope of the search from within any top level category or subcategory, including between category hierarchies, without initiating a new top level category search.

Having described the operation of the present invention from a user's perspective, a detailed description of the underlying systems and methods will now be described in detail below.

Figure 5:
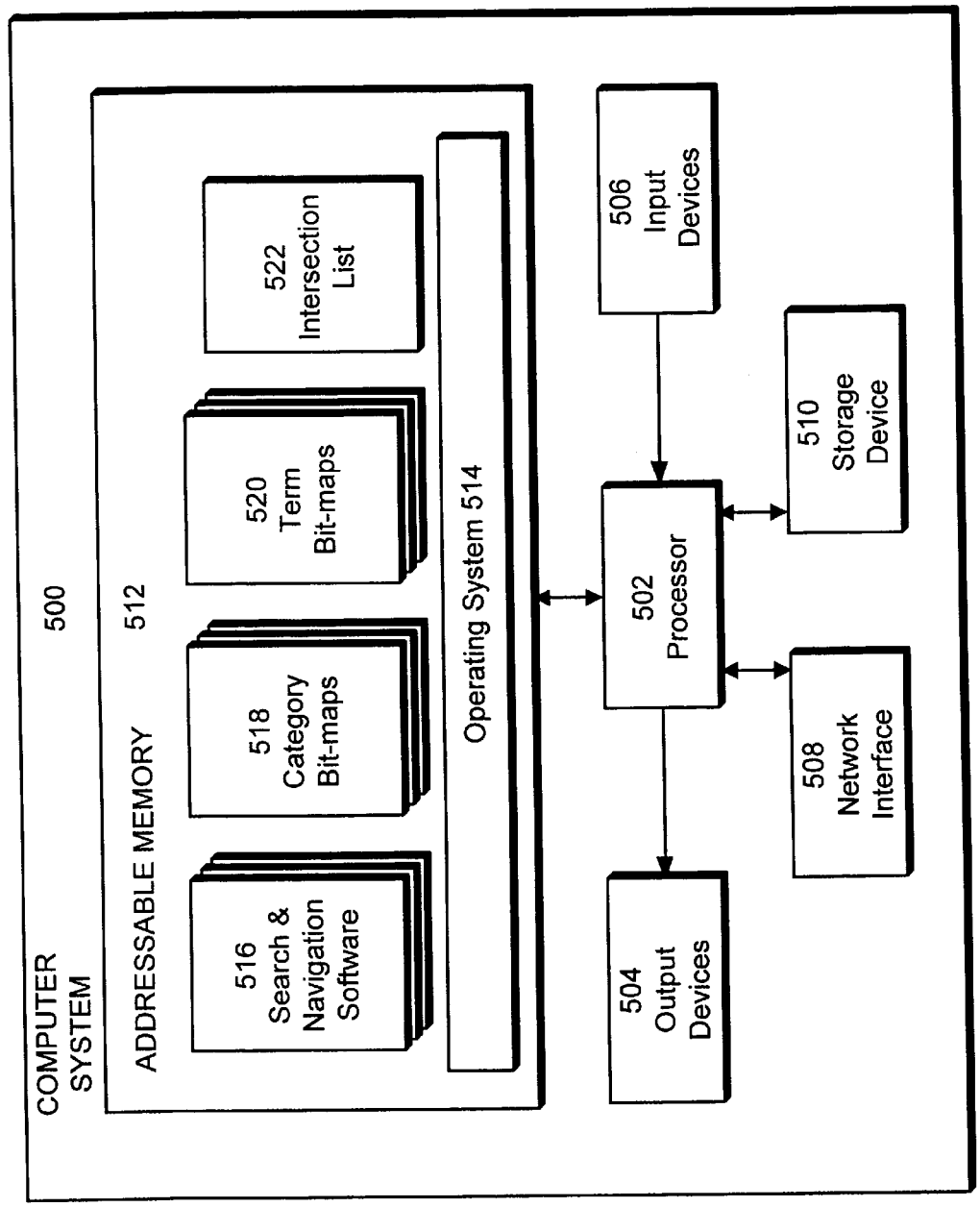
FIG. 5 is an illustration of computer system 500 in accordance with one embodiment of the present invention.

Referring to FIG. 5, there is shown an illustration of computer system 500 in accordance with one embodiment of the present invention. Preferably, computer system 500 is configured as a Web server for providing a Web site accessible by Internet users over telephone lines and other known communication channels. Computer system 500 preferably includes processor 502, output devices 504, input devices 506, network interface 508, storage device 510, and addressable memory 512. Processor 502 is, for example, from the family of Pentium™ processors manufactured by Intel Corporation of Santa Clara, Calif. Processor 502 is for executing the software components of the system. Output devices 504 preferably include a video display terminal (not shown) for presenting various search forms to users of computer system 500. Input devices 506 preferably include a conventional keyboard (not shown), and a conventional pointing device, such as a mouse or trackball (not shown) for allowing the user to enter search terms, and the like. Network interface 508 preferably includes a high speed modem (e.g., 56 Kbps) for connecting to outside networks such as the Internet and commercial online services via telephone lines or other known communication channels, such as T1 and T3 data connections and/or a Integrated Services Digital Network (ISDN). Storage device 510 preferably stores the database of documents to be searched and comprises any device, real or virtual, used to store digitized information including: diskette drives, hard drives, tape drives, optical/laser storage devices, and computers configured as database servers.

Addressable memory 512 preferably includes any device, real or virtual, used to hold digitized information including, but not limited to, Random Access Memory (RAM), Dynamic RAM, Video RAM, and Read-only Memory (ROM).

Addressable memory 512 further includes operating system 514, search & navigation software 516, category bit-maps 518, term bit-maps 520, and intersection list 522. Operating system 514 is, for example, Windows™ NT manufactured by Microsoft corporation of Redmond, Wash. The operating system provides system services, including device drivers, necessary for controlling and communicating with peripherals and other conventional computer system functions. Additionally, addressable memory 512 includes Web server software (not shown), such as Netscape Enterprise Server™ manufactured by Netscape Corporation of Mountain View, Calif. to enable users to access the database. Search & navigation software 516 preferably comprises one or more functions for generating intersection lists and carrying out the search and navigation of databases and other information sources in accordance with the present invention. These functions also generate and/or operate on one or more category bit-maps 518, term bit-maps 520, and intersection lists 522 included in addressable memory 512, as described in detail below. Search & navigation software 516 is preferably implemented using any known computer language, such as "C" or an equivalent computer language. Alternatively, search & navigation software 516 can be implemented using an object oriented computer language, such as "C++" or an equivalent.

Bit-Map Generation

Figure 6:
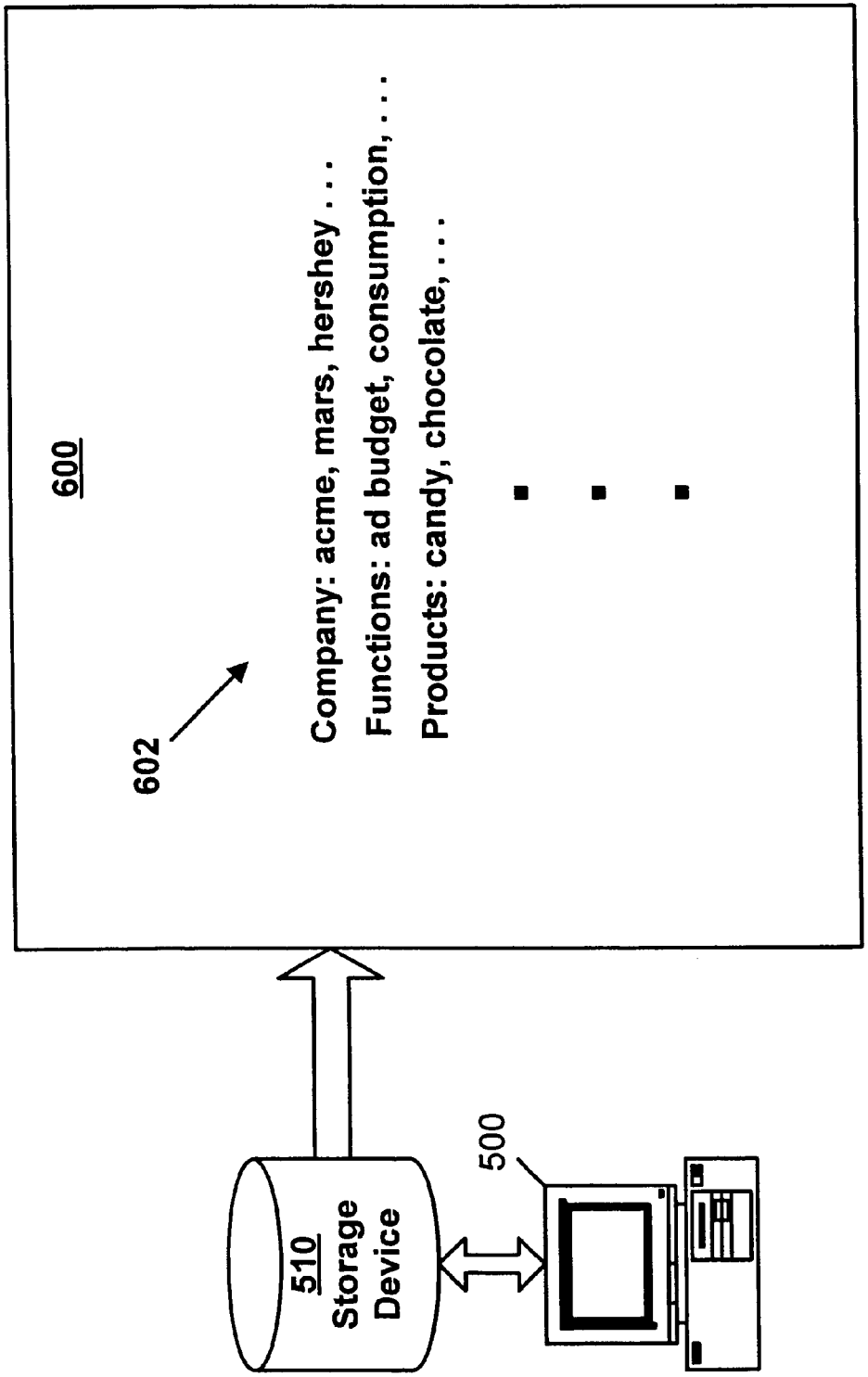
FIG. 6 is an illustration of systems and methods for generating category bit-maps 518 for database documents in accordance with one embodiment of the present invention.

Referring to FIG. 6, there is shown an illustration of systems and methods for generating category bit-maps 518 for documents in accordance with one embodiment of the present invention. Category bit-maps 518 are preferably generated off-line, either manually or automatically, by an information manager. During the category bit-map generation process, documents from storage device 510 are assigned to predefined categories and subcategories. For each category or subcategory there is generated a category bit-map 518 for all of the documents in storage device 510. A category bit-map 518 indicates whether a document is or is not a member of the category.

Computer system 500 is coupled to storage device 510 for receiving stored documents. Computer system 500 includes processor 502 (FIG. 5) for executing search & navigation software 516 (FIG. 5). By example, search & navigation software 516 in computer system 500 scans document 600 which has been field encoded with index fields 602 and assigns document 600 to one or more previously defined categories. Index fields 602 preferably include: Company, Functions, Industries, and Products. For each of the index fields 602 there are one or more index terms present in document 600. For example, the index field Company can include the names of any companies mentioned in the document. In this fashion, a search on any of these companies retrieves the document.

It is noted that any number and type of index fields 602 may be used with the present invention without departing from the spirit or scope of the present invention.

Index fields 602 are used by search & navigation software 516 to construct category bit-maps 518. Each category bit-map contains a bit position for each and every document 600 contained in storage device 510. It will be appreciated that these bit-maps are extremely large. For example, a typical embodiment will have about one million documents and, thus, each bit-map is about one megabyte in size. With typically 200 to 500 categories, the memory needed for these bit-maps is substantial. A bit position set equal to "1" is indicative of the assignment of document 600 to the category associated with the category bit-map. Category citmaps 518 can be stored, for example, as computer-readable binary data in contiguous (e.g., compacted) portions of addressable memory 512 (FIG. 5). To assist the reader in understanding the present invention, a hierarchical format of category bit-maps 518 is described below with respect to FIG. 7.

Figure 7:
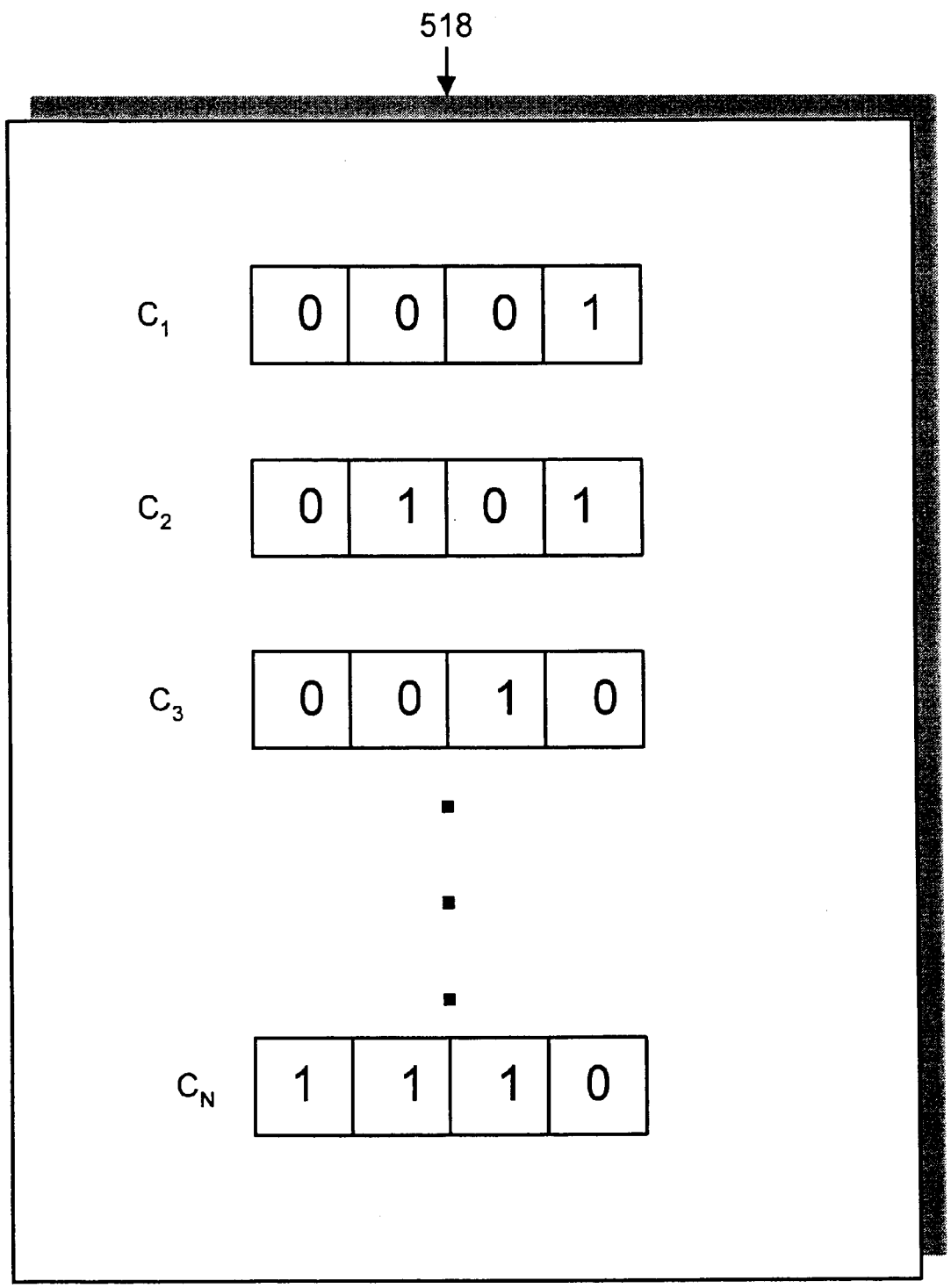
FIG. 7 is an illustration of category bit-maps 518 in accordance with one embodiment of the present invention.

Referring to FIG. 7, there is shown an illustration of category bit-maps 518 in accordance with one embodiment of the present invention. In FIG. 7, category bit-maps 518, $C_1$–$C_N$, are arranged in a category hierarchy, where N is the total number of categories in a category hierarchy. The highest category $C_1$ defines the broadest scope of a particular subject matter, and the subcategories, $C_2$–$C_N$, are indicative of searches having increasingly narrower scope under category $C_1$. The total number of bit positions in each bit-map is equal to the total number of documents in storage device 510. For ease of discussion, however, only four records are shown for each bit-map in FIG. 7. For example, a first bit position for a first document in category bit-map $C_1$ contains a "0," thus indicating that the first document is not related nor assigned to the subject matter of category $C_1$. Similarly, a last "bit" position for a last document in category bit-map $C_1$ contains a "1," thus indicating that the last document is related and assigned to the subject matter of category $C_1$.

Generally, category bit-maps are subject to Boolean operations, such as "AND", "OR", and "Exclusive-Or," to form additional bit-maps. For example, category bit-maps $C_1$ and $C_2$ can be "AND" together to form a resultant bit-map having a "1" in the fourth bit position and a "0" in each remaining bit position. Upon completion of this operation, the fourth bit position is indicative of the fourth document being related or assigned to the subject matter of both categories $C_1$ and $C_2$.

It is noted that the category hierarchies can be determined off-line by, for example, an information manage. The number and types of category hierarchies can be determined manually or automatically for a variety of databases by, for example, an information manager.

Figure 8:
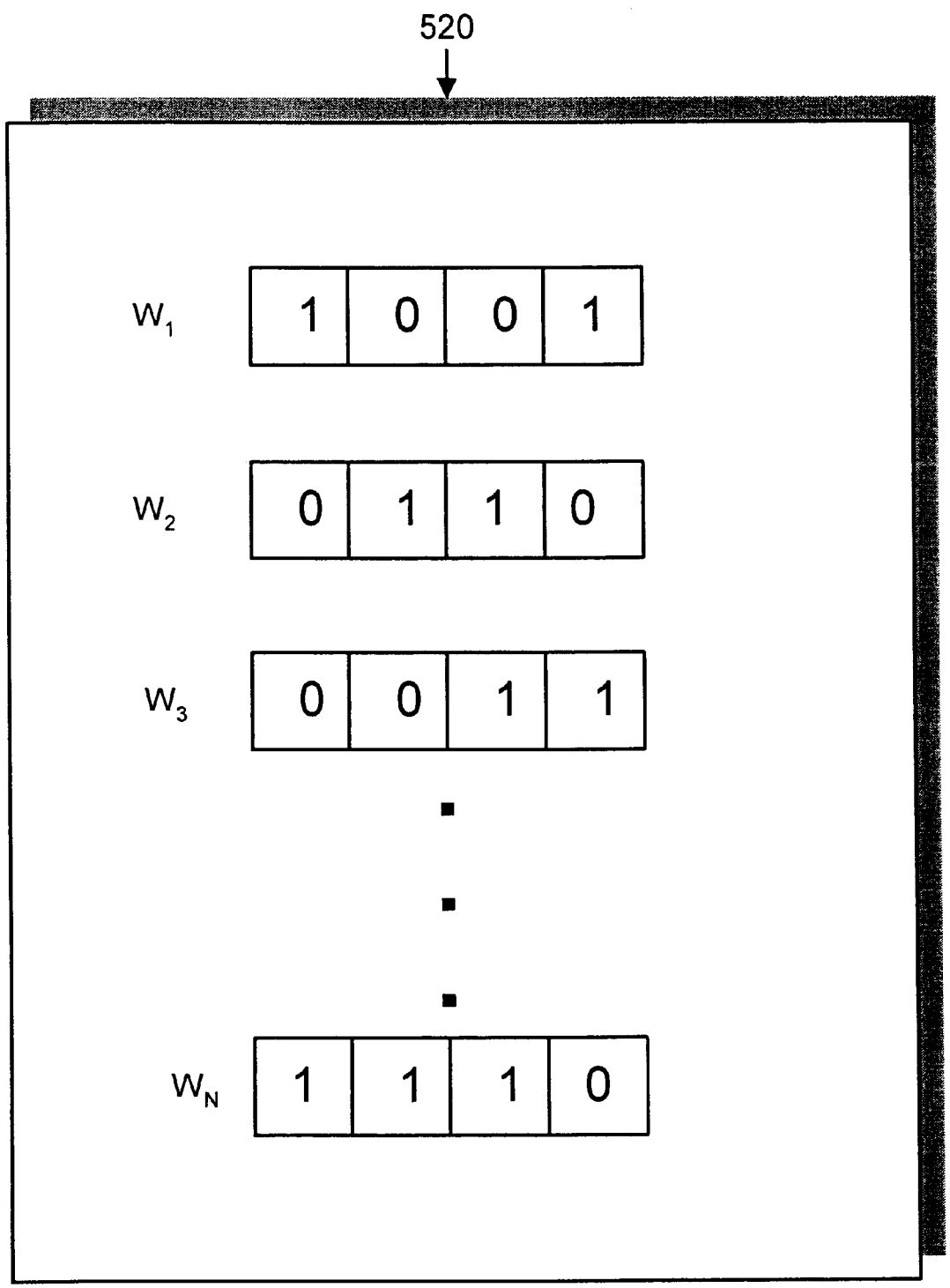
FIG. 8 is an illustration of term bit-maps 520 in accordance with one embodiment of the present invention.

Referring to FIG. 8, there is shown an illustration of term bit-maps 520 in accordance with one embodiment of the present invention. The format of term bit-maps 520 is similar to the format of category bit-maps 518 in that category bit-maps 518 contain a bit position for each and every document 600 contained in storage device 510. Each of the term bit-maps $W_1$–$W_N$ corresponds to a search term. For example, term bit-map $W_1$ can correspond to the term "acme" or "candy" as previously described with respect to FIGS. 2–4. As with category bit-maps 518, term bit-maps 520 are also subject to Boolean operations, such as "AND", "OR", and "Exclusive-Or," to form additional bit-maps. By performing Boolean operations on term bit-maps, it is possible to determine whether a document contains multiple terms corresponding to the bit-maps.

It is noted that term bit-maps 520 will include term bit-maps for any of the index terms used in the index fields 602, as described with respect to FIG. 6. Moreover, the terms in the term bit-maps 520 can be single words, multiple words, phrases, or the like. In the preferred embodiment, terms include all or most word pairs of single terms.

It is further noted that term bit-maps 520 can be determined off-line by, for example, an information manager. The number and types of term bit-maps 520 can be determined manually or automatically for a variety of databases by, for example, an information manager.

Report Key generation

Figure 9:
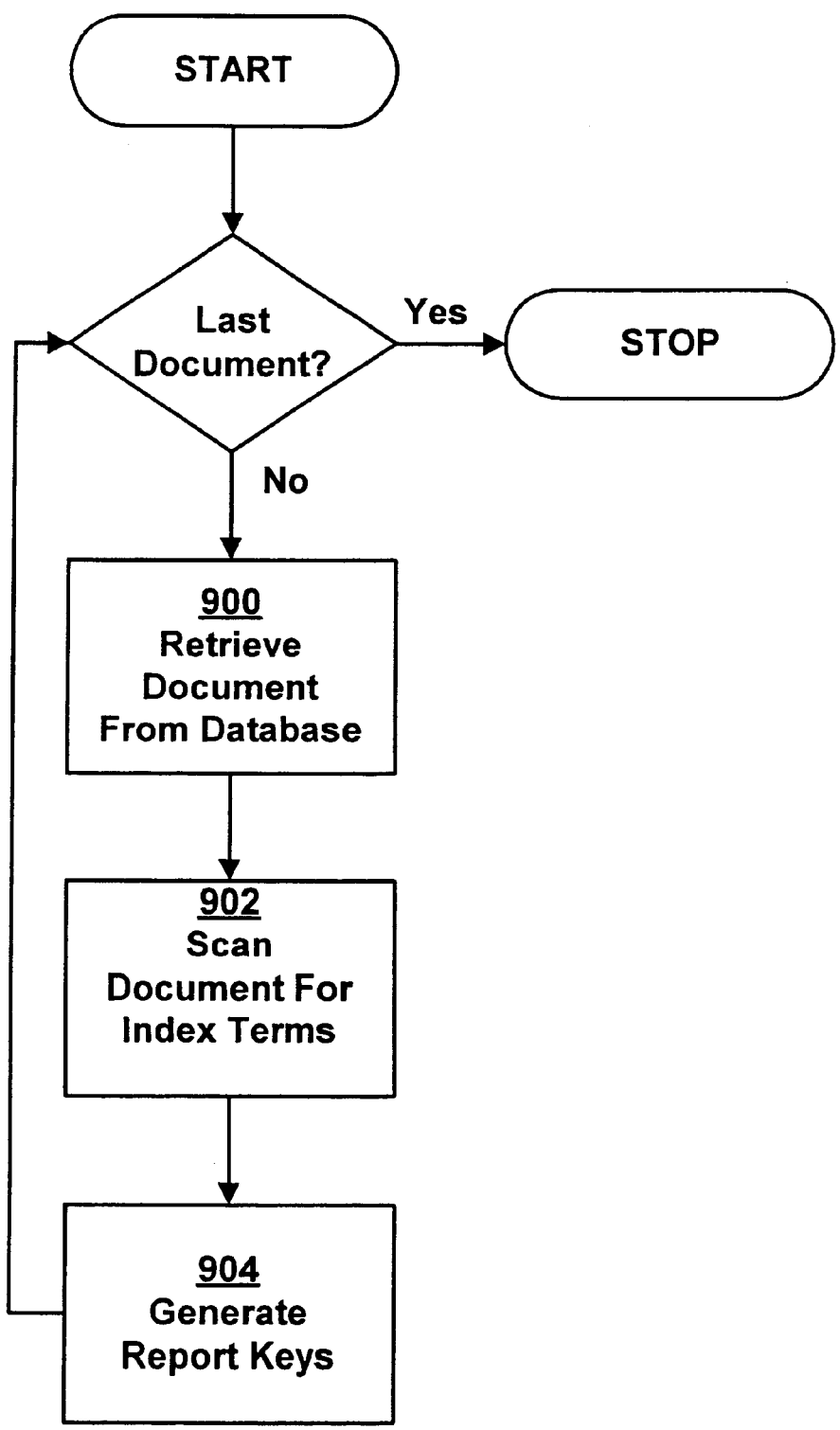
FIG. 9 is a flow diagram of method steps for report key generation in accordance with one embodiment of the present invention.

Referring to FIG. 9, there is shown a flow diagram of method steps for report key generation in accordance with one embodiment of the present invention. The method of generating report keys begins by retrieving 900, document 600 from storage device 510, and scanning 902 the document 600 for index terms, both in the body text or in the index fields 602. For each document 600, the index terms are concatenated to top level category descriptors to generate 904 text strings (hereinafter also referred to as "report keys"). Preferably, the report keys comprise name/value pairs of the form name1.value1.name2.value2..., where the name1 field preferably is the top level category descriptor, "company," and the value1 field is a corresponding index term found in the corresponding index field 602. Similarly, the name2 field preferably is a top level category descriptor, such as functions, industries, or products, and the value2 field is a corresponding index term found in document 600, such as "adbudget." In the present example, one report key is of the form company.acme.function.adbudget. Here, company is a top level category descriptor, acme is the company name, function is a descriptor for the top level category "functions," and adbudget is a descriptor for the subcategory "adbudget," which is a subcategory of "functions."

In the preferred embodiment, report keys are generated from all intersections of top level category descriptors, such as company, functions, industries, and products, against all index terms found in document 600. Alternatively, report keys are generated from all permutations of only a few top level category descriptors, such as company and industry, which are paired against all index terms found in document 600. The combination of all report keys for a single document 600 is hereinafter referred to as a report key set, which is described in detail with respect to FIG. 10.

Referring to FIG. 10, there is shown an illustration of a report key set in accordance with one embodiment of the present invention. The report key set in FIG. 10, for example, is generated by pairing top level category descriptors against all other index terms in document 600.

Sorting & Updating Report Keys

Figure 11:
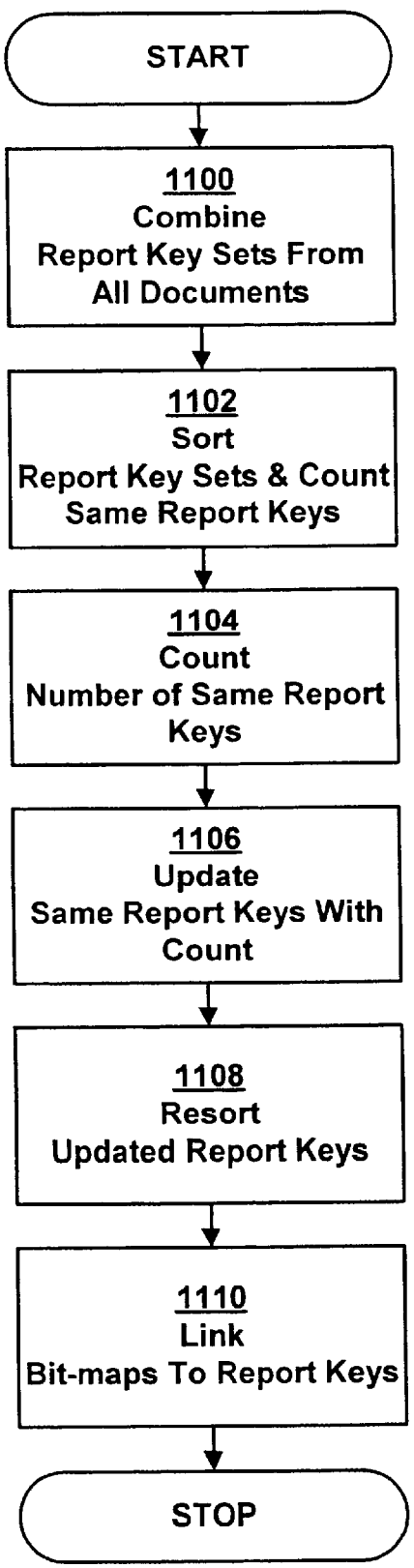
FIG. 11 is a flow diagram of method steps for sorting report keys in accordance with one embodiment of the present invention.

Referring to FIG. 11, there is shown a flow diagram of method steps for sorting report keys in accordance with one embodiment of the present invention. After all report key sets are generated 904 as described above with respect to FIG. 10, the report key sets for all the documents in the database, including new documents, are combined 1100 into one contiguous data set (not shown) in preparation for sorting. The data set can be quite large, for example, 40 Gb, and can be stored in storage device 510 (FIG. 5). The contiguous data set is sorted 1102 using known techniques, such as a "Quick Sort" algorithm. Preferably, the data set is sorted in ascending alphabetical order. By sorting in this manner, identical report keys will cluster together in the sorted data set. These identical report keys can then be counted 1104, thereby giving the number of documents corresponding to each report key. For example, after a count is established for identical report keys, one of the report keys in the group of identical report keys is selected to be updated 1106 with the count of documents for that report key, and the remaining report keys in the group are deleted from the sorted data set. The count is used to reflect the number of hits for that specific category intersection, as shown in FIGS. 2–4. Preferably, the selected report key is updated 1106 by inserting a negative number equal to the count in the report key itself, after the top level category descriptor in the report key. One example of an updated report key is company.acme.products.–18.dogandcatfood, as shown in FIG. 12. The negative number in this example is –18h, or 119 decimal. In other words, there are 119 documents that are about the company Acme and the subcategory dog and cat food. Negative numbers are useful because they sort in descending order, which benefits the following step of resorting 1108 the previously sorted and filtered data set of report keys. The benefit is that the most nearly duplicate report keys are listed first. After resorting 1108 the data set, each resort key is linked 1110 to the bit-map of the lowest subcategory described in the report key. The link 1110 between the report key and the bit-map is made via a pointer, which, preferably, is stored at the end of the report key. Pointers are well-known software constructs used in most modern programming languages, such as "C." A pointer is a variable that holds a memory address. This address is usually the location of another variable in memory. Here, each report key is linked 1110 to a pointer that holds the memory address of the bit-map of the lowest subcategory described in the report key. The pointer need only point to the lowest subcategory (e.g., Ad Budget) because at this point the memory locations of the bit-maps for the higher level categories are already known once the user is viewing search form 200, as shown in FIG. 2.

Referring to FIG. 12, there is shown an illustration of an intersection list in accordance with one embodiment of the present invention. After resorting 1108, nearly identical report keys remain clustered together within the resorted list, as shown in FIG. 10. Further, the position of each report key within a particular cluster is determined by the count. Thus, report keys within a first cluster are listed in, for example, descending order based on their respective counts relative to the counts of other reports keys in the same cluster. By way of illustration, FIG. 12 shows three report key clusters in a resorted report data set (hereinafter also referred to as an "intersection list"), wherein each report key includes a first name/value pair company.acme, as first described with respect to FIG. 10. Thus, all report keys having the same first name/value pair are in the same cluster with the intersection list. Within each cluster of report keys are one or more subclusters of report keys based on a second name/value pair, which includes, for example, the subcategory descriptors industries and products.

Searching & Navigating The Database Using Intersection Lists

Figure 13:
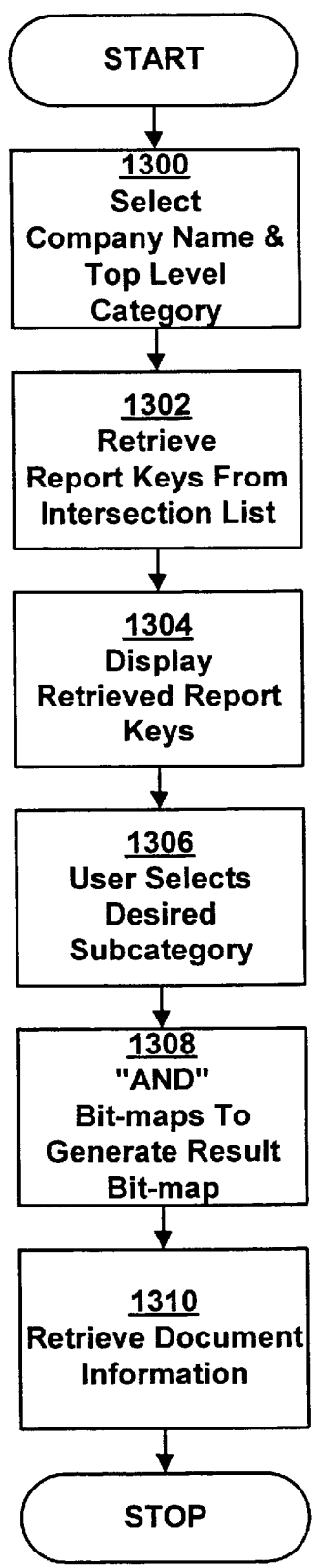
FIG. 13 is a flow diagram of method steps for document information retrieval by a first top level category selection using an intersection list in accordance with one embodiment of the present invention.

Referring to FIG. 13, there is shown a flow diagram of method steps for document retrieval by category in accordance with one embodiment of the present invention. The searching and navigating functions are performed by search & navigation software 515, as described with respect to FIG. 5.

The process begins with the user selecting 1300 a company name (e.g., Acme) and a top level category (e.g., Functions, Industries, Products) as described in FIGS. 1 and 2. In response to the user's selections, a set of corresponding report keys is identified and retrieved 1302 from an intersection list (FIG. 12). For example, if the user selects "acme" and "functions" as a first and second top level category, respectively, than the present invention will identify and retrieve 1302 the report keys from the intersection list that fall within the scope of these top level categories. Preferably, the category descriptors in the report keys are formatted and displayed 1304 as in search form 200 in FIG. 2. Thus, without having to actually search the documents, the system can immediately inform the user of the number of documents in each subcategory because the document count is in the report key built during the intersection pre-computation.

To search for documents by subcategory, the user selects 1306 the desired subcategory as described with respect to FIG. 3. In response to the user selecting 1306 a subcategory (e.g., "Ad Budget"), the present invention performs an "AND" operation 1308 on the bit-maps for the term "acme" and the subcategory "adbudget," respectively. More particularly, the term bit-map for "acme" is "AND" 1308 with the subcategory bit-map for "adbudget," thus creating a first result bit-map indicative of all documents containing the term "acme," that are also within the subcategory "adbudget." The first result bit-map is used to retrieve 1310 document information from storage device 510.

Figure 14:
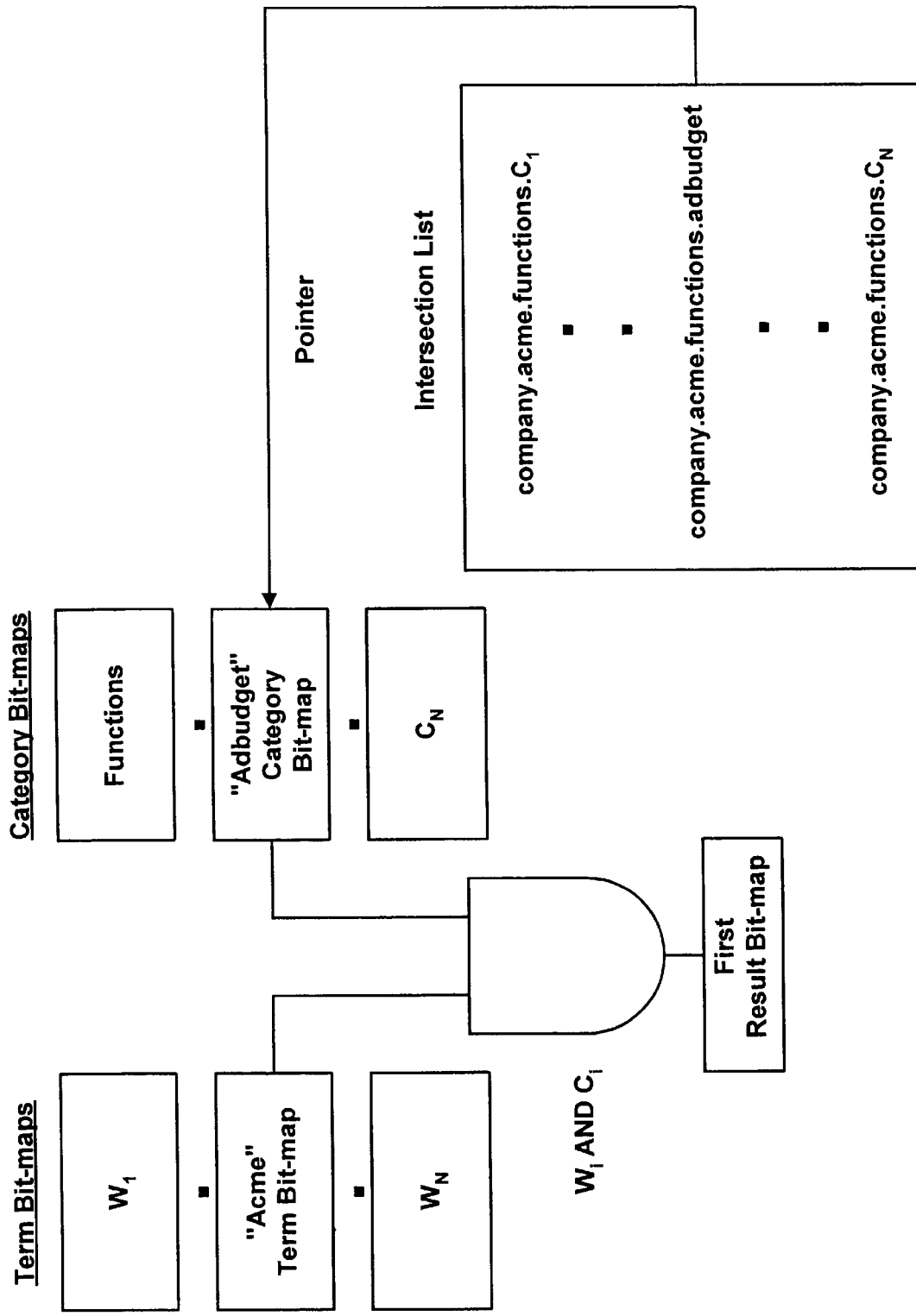
FIG. 14 is an illustration of document information retrieval by a first top level category selection using an intersection list in accordance with one embodiment of the present invention.

Referring to FIG. 14, there is shown an illustration of document retrieval using intersection lists in accordance with one embodiment of the present invention. The use of an intersection list enables the memory addresses of subcategory bit-maps to be accessed via pointers, as described with respect to FIG. 9. For example, in response to the user's selection of the subcategory "Ad Budget" from a list of subcategories, the corresponding report key in the intersection list provides a pointer link to the bit-map for subcategory "Ad Budget." The subcategory "Ad Budget" is the lowest subcategory in the category hierarchy described in the report key. The bit-map is retrieved via the pointer link, then logically "AND" with the term bit-map for the term "acme" to produce a first result bit-map. The first result bit-map is used to retrieve document information from the storage device 510 that includes the index term "acme," and also falls within the subcategory "Ad Budget."

Figure 15:
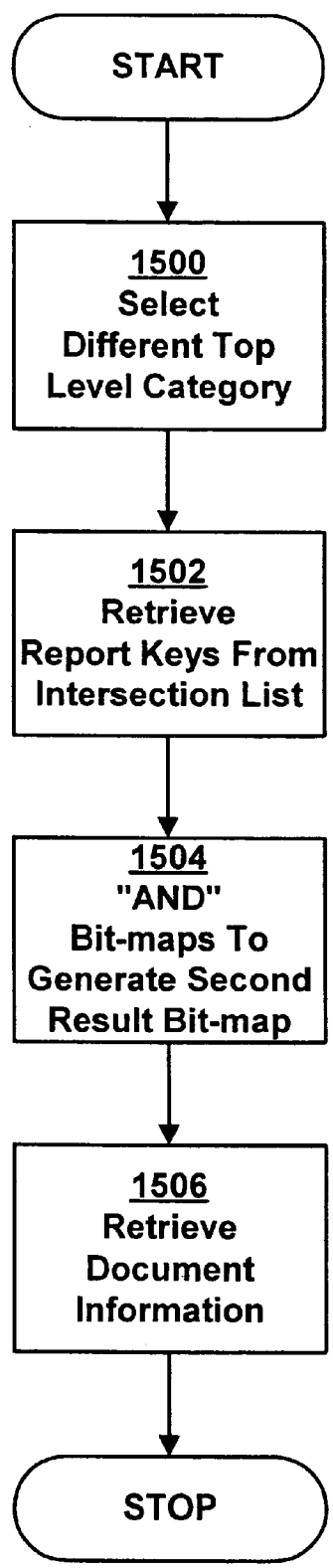
FIG. 15 is a flow diagram of method steps for document information retrieval by a second top level category selection using an intersection list in accordance with one embodiment of the present invention.

Referring to FIG. 15, there is shown a flow diagram of method steps for document retrieval using an intersection list in accordance with one embodiment of the present invention. The method described below is used if the search has already been narrowed to a subcategory within a category hierarchy, as described with respect to FIG. 4. While the user is exploring the current subcategory (e.g., Ad Budget), the user can select 1500 a different top level category (e.g., Products). In response to the user's selection 1500, reports keys are retrieved 1502 from the intersection list that correspond to the user's selection. The intersection list is traversed to identify and retrieve 1502 report keys that fall within the scope of the term "acme" and the top level category "Products." All of the category bit-maps corresponding to the top level category "Products" are "AND" 1504 with the first result bit-map (FIG. 14) to produce a second result bit-map. The second result bit-map is used to retrieve 1506 document information from the storage device 510.

Figure 16:
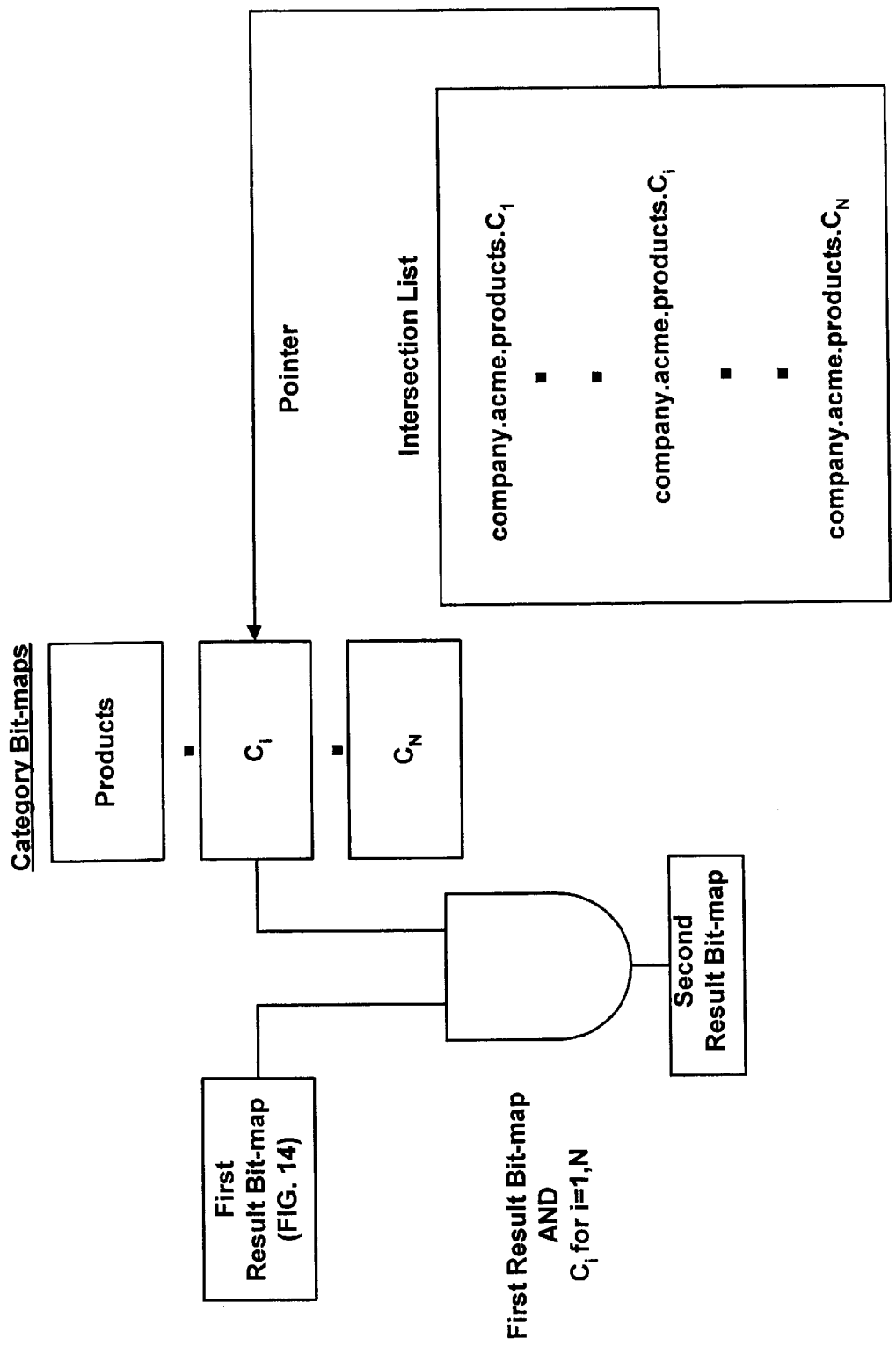
FIG. 16 is an illustration of document information retrieval by a second top level category selection using an intersection list in accordance with one embodiment of the present invention.

Referring to FIG. 16, there is shown an illustration of document retrieval using intersection lists in accordance with one embodiment of the present invention. This illustration demonstrates an advantage of the present invention: providing users with easy access to related information between category hierarchies without adding considerable delay to the search. As shown in FIG. 16, the first result bit-map is logically "AND" with each subcategory bit-map described in report keys that fall within the scope of the top level category "products" to produce a second result bit-map. The second result bit-map is used to retrieve document information from storage device 510.

As illustrated in FIGS. 13–16, an important advantage of the present invention is its capability to provide a high level of flexibility to the user for searching and navigating through documents in a database or other information source. The user can easily narrow, expand, and refocus the scope of the search across categories and subcategories of documents in combination with term or text searching. More importantly, the user can narrow, expand, or refocus the scope of the search from within any top level category or subcategory, including between category hierarchies, without initiating a new top level category search.

Although the present invention has been described in considerable detail with reference to certain preferred embodiments thereof, other embodiments are possible. For example, the present invention can be implemented in a distributed computer system having a distributed database, or on a standalone computer system. Therefore, the spirit and scope of the appended claims should not be limited to the description of the preferred embodiments contained herein.

What is claimed is:

1. A computer-implemented method of generating report key lists for executing search queries on a database having a plurality of documents, comprising the steps of:

searching each of the documents for an index term;

generating for each of the documents a report key from the index term and a pre-defined index field, the report key including a pointer to a bit-map in memory, the bit-map indicative of database documents associated with at least one user selected category of information;

combining the report keys generated from the documents into an intersection list; and sorting the intersection list according to a predetermined sort criteria.

2. The method of claim 1 further comprising:

determining from the sorted intersection list a count of the number of the documents sharing a same report key;

updating the same report key with the count;

re-sorting the intersection list according to the predetermined sort criteria; and linking the bit-map to the report key via a pointer, said pointer holding a memory address of the bit-map of the lowest subcategory.

3. The method of claim 1, wherein generating for each of the documents a report key includes:

retrieving the document;

scanning the document for an index term representing a category value; and concatenating the index term to a pre-defined index field, said pre-defined index field representing a category descriptor to generate a report key.

4. The generated report key of claim 3 further comprising name/value pairs of the form name.1value1.value2. . . wherein the name1 field can be a top level category descriptor, "company", and wherein the value1 field is a corresponding index term; and the name2 field can be a top level category descriptor, "functions", and wherein the value2 field is a corresponding index term.

5. The generated report key of claim 3, comprising name/value pairs name1 field.value1 field.name2 field-.value2 field . . . , wherein:

the name 1 field is a top-level category descriptor and wherein the value 1 field is a corresponding index term; and the name 2 field is a top-level category descriptor and wherein the value 2 field is a corresponding index term.

6. A system for executing search queries on a database having a plurality of documents, the system comprising:

a memory including:

a computer program having a report key function for generating an intersection list from the documents; and a processor for executing the computer program and invoking the report key function to generate the intersection list, the report key function comprising the steps of:

searching each of the documents for an index term;

generating for each of the documents a report key from the index term and a pre-defined index field, the report key including a pointer to a bit-map in memory;

combining the report keys generated from the documents into an intersection list; and sorting the intersection list according to a predetermined sort criteria.

7. The system of claim 6, wherein the report key function further comprises:

determining from the sorted intersection list a count of the number of the documents sharing a same report key;

updating the same report key with the count;

re-sorting the intersection list according to the predetermined sort criteria; and linking the bit-map to report key via a pointer, said pointer holding a memory address of the bit-map of the lowest subcategory.

8. A computer-readable medium having stored thereon instructions which, when executed by a processor, cause the processor to perform the steps of:

searching each of the documents for an index term;

generating for each of the documents a report key from the index term and pre-defined index field, the report key including a pointer to a bit-map;

combining the report keys generated from the documents into an intersection list; and sorting the intersection list according to a predetermined sort criteria.

9. The computer-readable medium of claim 4, further comprising:

determining from the sorted intersection list a count of the number of the documents sharing a same report key;

updating the same report key with the count;

re-sorting the intersection list according to the predetermined sort criteria; and linking the bit-map to report key via a pointer, said pointer holding a memory address of the bit-map of the lowest subcategory.

* * * * *

UNITED STATES PATENT AND TRADEMARK OFFICE
CERTIFICATE OF CORRECTION

PATENT NO. : 6,513,032 B1
DATED : January 28, 2003
INVENTOR(S) : Paul Sutter

It is certified that error appears in the above-identified patent and that said Letters Patent is hereby corrected as shown below:

Column 13,
Lines 8-9, change "name.1value1.value2… wherein" to
-- name1.value1.name2.value2 … wherein --.

Signed and Sealed this

Twenty-fourth Day of June, 2003

JAMES E. ROGAN
*Director of the United States Patent and Trademark Office*